(12) United States Patent
Fournié et al.

(10) Patent No.: US 11,440,502 B2
(45) Date of Patent: Sep. 13, 2022

(54) TRANSMISSION METHOD IN A PASSIVE ACTIVATION SYSTEM FOR ACTIVATING AT LEAST ONE FUNCTION PRESENT IN A MOTOR VEHICLE

(71) Applicants: Continental Automotive France, Toulouse (FR); Continental Automotive GmbH, Hannover (DE)

(72) Inventors: Alex Fournié, Ste Foy de Peyrolières (FR); Christophe Grisey, Colomiers (FR); Cédric Boudet, Aucamville (FR); Xavier Bressan, Pompertuzat (FR)

(73) Assignees: CONTINENTAL AUTOMOTIVE FRANCE, Toulouse (FR); CONTINENTAL AUTOMOTIVE GMBH, Hannover (DE)

( * ) Notice: Subject to any disclaimer, the term of this patent is extended or adjusted under 35 U.S.C. 154(b) by 352 days.

(21) Appl. No.: 16/753,883

(22) PCT Filed: Oct. 8, 2018

(86) PCT No.: PCT/FR2018/052479
§ 371 (c)(1),
(2) Date: Apr. 6, 2020

(87) PCT Pub. No.: WO2019/073158
PCT Pub. Date: Apr. 18, 2019

(65) Prior Publication Data
US 2020/0282952 A1    Sep. 10, 2020

(30) Foreign Application Priority Data
Oct. 12, 2017  (FR) ...................................... 1759561

(51) Int. Cl.
*H04N 5/44* (2011.01)
*B60R 25/24* (2013.01)
*G07C 5/08* (2006.01)

(52) U.S. Cl.
CPC ............ *B60R 25/24* (2013.01); *B60R 25/245* (2013.01); *G07C 5/0816* (2013.01)

(58) Field of Classification Search
CPC .. H04W 12/06; B60R 25/003; B60R 25/1001; G07C 9/00174; G07C 2009/00793
See application file for complete search history.

(56) References Cited

U.S. PATENT DOCUMENTS 6,119,155 A    9/2000  Rossmann et al.
8,995,425 B1   3/2015  Dropps et al.
(Continued)

FOREIGN PATENT DOCUMENTS

CN    1949203 A      4/2007
CN   103810825 A     5/2014
(Continued)

OTHER PUBLICATIONS

International Search Report and Written Opinion for International Application No. PCT/FR2018/052479, dated Dec. 3, 2018, 8 pages.

*Primary Examiner* — Munear T Akki
(74) *Attorney, Agent, or Firm* — RatnerPrestia (57) ABSTRACT

A method for transmitting in a passive activation system in a motor vehicle. Between each use-case module and a protocol driver an intermediate management layer is inserted that receives requests from the modules and stores them in a list according to oldness and priority ranking, selects a main request with the highest priority ranking, selects requests compatible with the main request, sends at least one grouped signal corresponding to the main and compatible requests to a portable activation device, receives back from the activation device at least one signal transmitted to the
(Continued)

intermediate layer allowing the activation device to be located and then the location thereof to be sent to the case modules that sent the main request or a compatible request, and deletes the main and compatible requests from the list.

12 Claims, 4 Drawing Sheets

(56) References Cited

U.S. PATENT DOCUMENTS

| | | |
|---|---|---|
| 2010/0039221 A1 | 2/2010 | Lickfelt et al. |
| 2014/0129054 A1 | 5/2014 | Huntzicker et al. |
| 2016/0005250 A1* | 1/2016 | Inoue .................... B60R 25/209 |
| | | 701/2 |
| 2016/0267735 A1 | 9/2016 | Hamada et al. |
| 2017/0063994 A1 | 3/2017 | Lei et al. |
| 2017/0247918 A1* | 8/2017 | Oomi ....................... E05B 77/48 |
| 2017/0298659 A1* | 10/2017 | Watanabe ............... E05B 77/54 |
| 2018/0106882 A1* | 4/2018 | Kanaga ................. G01S 5/0284 |
| 2019/0219678 A1* | 7/2019 | Miyazawa .............. E05B 49/00 |

FOREIGN PATENT DOCUMENTS

| | | |
|---|---|---|
| CN | 105578421 A | 5/2016 |
| CN | 105966353 A | 9/2016 |
| CN | 106487778 A | 3/2017 |
| EP | 1228931 A2 | 8/2002 |
| EP | 2154035 A1 | 2/2010 |
| WO | 02078276 A1 | 10/2002 |

* cited by examiner

TRANSMISSION METHOD IN A PASSIVE ACTIVATION SYSTEM FOR ACTIVATING AT LEAST ONE FUNCTION PRESENT IN A MOTOR VEHICLE

CROSS REFERENCE TO RELATED APPLICATIONS

This application is the U.S. National Phase Application of PCT International Application No. PCT/FR2018/052479, filed Oct. 8, 2018, which claims priority to French Patent Application No. 1759561, filed Oct. 12, 2017, the contents of such applications being incorporated by reference herein.

FIELD OF THE INVENTION

The present invention relates to a method for transmitting in a passive activation system at least one functionality present in a motor vehicle.

BACKGROUND OF THE INVENTION

More specifically, in a passive activation system, the activation comes after a bidirectional transmission, between at least one activation means carried by one or more persons authorized to perform this activation and an activation assembly present in the vehicle, involving sending, receiving and measuring electromagnetic waves between the activation assembly and said at least one portable activation means with a view to locating said at least one portable activation means.

The activation assembly is able to recognize the portable activation means, to determine a mathematical position in an electromagnetic field space of the activation means for a detection zone, and to authorize the activation in this case.

The number of functionalities present in a passive activation system has considerably increased, and no longer solely only concern the opening of a door of the vehicle and the starting of the vehicle, but also comfort functions and functions for monitoring elements present in the vehicle, such as for example and non-limitingly, a level of charge of the battery.

Before activating one of these functionalities, it is necessary to know the location of the portable activation means. Specifically, for example, the opening of a trunk will be activated when an activation means is located for a predetermined period of time in a rear zone of the vehicle. This also applies to the opening of a door when a portable activation means is located in a zone beside the vehicle.

To be implemented all these possible functionalities require send requests to be sent from use-case modules with a view to locating the portable activation means. These requests have different duration and security constraints while using the same send and receive resources as well as software resources. It follows that the access of the functionalities has to be optimized in order to meet the security and duration requirements of the software system. Requirements relating to electronic components must also be fulfilled, in particular as regards their heating and the limitation of electromagnetic emissions.

Figure 1:
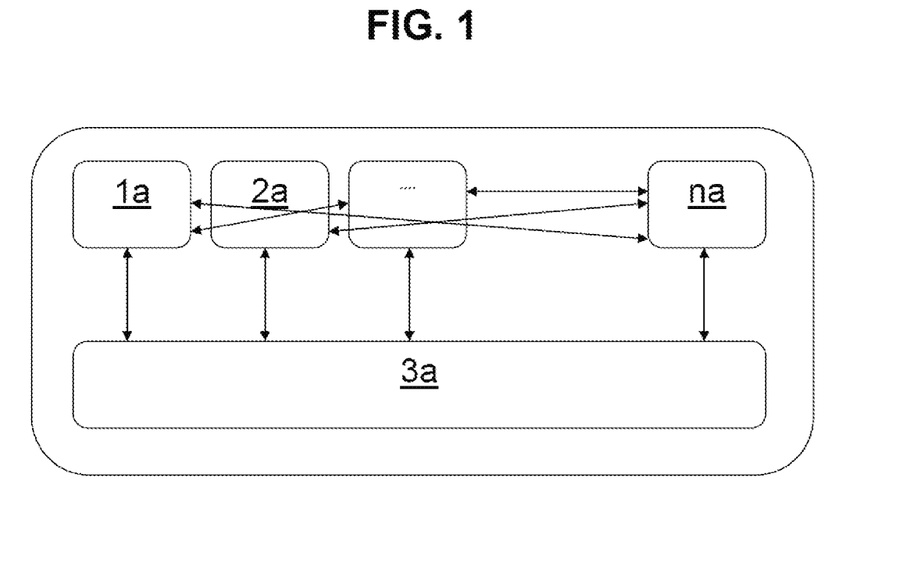
FIG. 1 is a schematic representation of a transmission system for a passive system for activating at least one functionality present in a motor vehicle according to the prior art.

FIG. 1 shows a transmission system forming part of an activation assembly present in a motor vehicle, this transmission system being in accordance with the prior art.

Various use-case modules $1a$ to $na$ that are separate from each other send requests to locate one or more portable activation means to a protocol driver $3a$, which sends advantageously low-frequency signals to the or each portable activation means. The or each portable activation means responds with at least one, advantageously radiofrequency, signal that allows the protocol driver $3a$ to determine the location of the or each activation means. The location of the or each activation means is transmitted by the protocol driver $3a$ to the use-case module $1a$ to $na$ that sent the request.

It is possible for the use-case modules $1a$ to $na$ to communicate with each other. This is illustrated in FIG. 1 by arrows between the use-case modules $1a$ to $na$. This allows communication constraints to be managed with exchanges of information, in particular on the location of the or each activation means, or by sending requests, between the use-case modules $1a$ to $na$. However, simultaneous use-case requests are grouped in many and unpredictable ways. Such an optimization of the transmission is therefore inflexible, this leading to complexity endlessly increasing and/or the efficiency thereof being limited.

Thus, optimization of the transmission in such a way at the use-case-module level is inflexible, this leading to an increase in the complexity of the exchanges between the use-case modules and limiting the efficiency of the transmission system. The sending of requests from the use-case modules and the exchanges between the transmission system and the or each of the portable activation means must be optimized to meet set duration and security requirements.

For example, if the number of requests sent by the use-case modules exceeds the capacity of the protocol driver to send and receive, it will no longer be possible to process these requests at the same time and the location of the or of each portable activation means will no longer be able to be done correctly.

SUMMARY OF THE INVENTION

Consequently, the problem underlying an aspect of the present invention is, in an activation assembly comprising a transmission system that sends and receives signals with one or more portable activation means following use-case requests, with a view to locating the or each portable activation means, that of optimizing the transmission by grouping the requests in order to decrease the software and send/receive resources mobilized to locate the or each portable activation means.

To this end, an aspect of the present invention relates to a method for optimizing a transmission, in a passive system for activating at least one functionality present in a motor vehicle, the activation coming after a bidirectional transmission between at least one activation means carried by one or more persons authorized to operate this activation and an activation assembly present in the vehicle, involving sending, receiving and measuring electromagnetic waves between the activation assembly and said at least one portable activation means, with a view to locating said at least one portable activation means, use-case modules of a respective functionality emitting requests for the location of said at least one portable activation means to a protocol driver in the activation assembly, this process being noteworthy in that, between each use-case module and the protocol driver, an intermediate management layer is inserted that:
  receives requests from use-case modules and stores them in a list present in a static matrix of optimization possibilities,
  classifies each request according to, on the one hand, a priority ranking and, on the other hand, an oldness of reception, priority criteria of the priority ranking being predetermined and stored beforehand in the matrix, selects a so-called main request having the highest priority ranking and the greatest oldness, the highest priority ranking being preponderant over the greatest oldness, selects, from the requests remaining in the list, those that are compatible with the main request to be executed with the main request, sends at least one grouped signal corresponding to the main request and to the compatible requests to said at least one portable activation means via the protocol driver, the protocol driver receiving back from said at least one portable activation means at least one signal that is transmitted to the intermediate management layer and that allows said at least one portable activation means to be located after processing, the intermediate layer sending to the use-case modules that respectively sent the main request or one of the compatible requests, the location of said at least one portable activation means, and deleting the main request and the compatible requests from the list present in the matrix.

The technical effect is a reduction in the software and send/receive resources used to locate one or each of the portable activation means.

In the prior art, exchanges between the use-case modules could be made to group certain requests but this took processing time and was ineffective since no requests were ranked and the use-case modules did not have request priority criteria available to them.

The method according to an aspect of the present invention, by virtue of the presence of the intermediate management layer, takes account of a priority ranking established beforehand with priority-ranking priority criteria that are predetermined and stored beforehand in the matrix. This could not be done by the use-case modules, which could not determine which request has priority and can be used as the main request grouping together compatible requests.

In the state of the art, many exchanges took place between the use-case modules, which took processing time and made the behavior of the software difficult to control. The method of an aspect of the present invention makes it possible to eliminate these exchanges between use-case modules, to simplify their software resources if necessary and to classify the requests in the intermediate management layer according to criteria stored in this layer. By implementing the method according to an aspect of the present invention, all the communications between use-case modules, which took time and immobilized the software resources of these modules, can be eliminated.

The requests, which arrive one after the other at the intermediate management layer, are memorized and classified and their compatibility is checked: the highest priority request can then be associated with other compatible requests. This decreases the number of requests sent from the protocol driver to the or each portable activation means and the number of responses (they are grouped for several requests) sent back by the or each activation means with a view to allowing the or each activation means to be located. This is done in the intermediate management layer, which redirects this information to the use-case modules that sent either the main request or a request compatible with the main request.

Advantageously, a compatibility of the requests is carried out with respect to a common location zone of said at least one portable activation means necessary for activating the functionality associated with a use-case module.

Specifically, it is possible to group compatible requests depending on a requested location of the activation means. For example, non-limitingly, a side door of the vehicle will only be opened if an activation means is located in a side area close to the vehicle. Other use cases may also be subject to such a presence of an activation means in a side area close to the vehicle.

The presence of an activation means in such a side zone suggests that the driver or a passenger will enter the vehicle, in which case other functionalities relating to comfort inside the passenger compartment are likely to be activated soon. Thus, it is advantageous that a request from a use case relating to interior comfort is processed simultaneously with a request to locate a portable activation means with a view to opening a door of the vehicle, the latter being the main request and the comfort use-case request being a compatible request.

Advantageously, the location requests from the respective use-case modules present in the list are compared one by one with the main request to find out whether these requests are compatible or not with the main request. All the compatible requests are grouped in the same request as the main request. The location zone may also be specified with respect to a location zone included in the location zone of the main request.

Advantageously, after deletion of the main request and of the compatible requests from the list, a previously incompatible request of the highest priority ranking and of the greatest oldness becomes the new main request and it is determined whether the other requests of the list are compatible or incompatible with the new main request.

This makes it possible, for example, for a trunk-opening use case request to follow on from a side-door-opening use case request, these two requests initially being incompatible.

Advantageously, when a subsequent request is sent to the intermediate management layer by a use-case module and stored in the list after at least one grouped signal corresponding to the main request and to the compatible requests has been sent to said at least one portable activation means via the protocol driver, and when this subsequent request is compatible with the main request, the location of said at least one portable activation means, which location is received back by the intermediate management layer via the protocol driver, is also sent to the use-case module that sent the subsequent request.

This preferred embodiment of the present invention relates to the reception of a compatible request that arrives after at least one grouped signal corresponding to the main request and to the compatible requests has been sent by the protocol driver. As the newly arrived request is compatible with the main request, the location of the or each portable activation means will also be sent thereto.

Advantageously, time is counted in the intermediate layer after the signal has been sent from the protocol driver to said at least one portable activation means and, when this counted time is less than a threshold duration of validity of the location of said at least one portable activation means and a new request that is compatible with the main request that required the location of said at least one portable activation means is received in the list, the location is sent to the use-case module that sent the new request.

This may happen when the locations have already been sent to the use-case module that sent the main request and to the use modules that sent a respective request compatible with the main request. The fact that the validity time is short enough to ensure that the location of a mobile activation means will not have changed is capitalized upon to send this location to the use-case module that sent the new request.

Advantageously, when said at least one portable activation means is not unitary, all the activation means are located. Specifically, for example, the driver, who is equipped with a portable activation means, may be in a side door-opening zone of the motor vehicle and want to enter the motor vehicle, and a passenger, who is equipped with another portable activation means, may be located behind the vehicle and want to open the trunk. These two locations are to be detected in order to allow the respective functionality to be activated, but this is done while respecting an order of priority of the two use-case requests.

An aspect of the present invention relates to a group of an assembly for activating at least one functionality present in a motor vehicle and of at least one activation means carried by one or more persons authorized to perform this activation, the activation coming after a bidirectional transmission between said at least one activation means and a transmission system integrated into the activation assembly, the transmission system comprising means for sending, receiving and measuring electromagnetic waves to and coming from said at least one portable activation means with a view to locating said at least one portable activation means, the transmission system comprising use-case modules of a respective functionality that send requests to locate said at least one portable activation means to a protocol driver of the system, noteworthy in that it implements such a method, the system comprising an intermediate management layer comprising means for receiving and storing requests in a list present in a static matrix of optimization possibilities with means for ranking the requests in oldness and priority according to priority criteria stored in the matrix, first means for selecting a so-called main request and second means for selecting requests from the list that are compatible with the main request, the protocol driver comprising means for sending a signal grouped depending on the selected requests and means for receiving at least one signal back from said at least one portable activation means and means for transmitting said at least one signal to the intermediate management layer, the intermediate layer comprising means for processing said at least one signal with a view to locating said at least one portable activation means and means for sending the location to each of the use-case modules that sent a main request or a request compatible with the main request as well as means for updating the list of requests.

The intermediate management layer simplifies and clarifies the software architecture of the transmission system and makes it adaptable to new use cases. As an order of priority has already entered into the intermediate management layer, the classification of requests is done more quickly. Interactions between use-case modules are greatly decreased, this decreasing the software resources and processing time required to group compatible requests.

Advantageously, the transmission system comprises low-frequency means for sending to said at least one portable activation means and radio-frequency means for receiving from said at least one portable activation means. These two send modes are the most used between the main activation assembly and the portable activation means.

Advantageously, the send and receive means take the form of a plurality of antennas arranged at different places on the vehicle, a mathematical position of said at least one activation means being determined via at least one reception-end measurement of the power received back by each antenna from said at least one activation means.

BRIEF DESCRIPTION OF THE DRAWINGS

Other features, aspects and advantages of the present invention will become apparent upon reading the detailed description that will follow and upon examining the appended drawings, given by way of nonlimiting example and in which.

DETAILED DESCRIPTION OF THE PREFERRED EMBODIMENTS

FIG. 1 has already been described in the introductory part of the present patent application.

Figure 2:
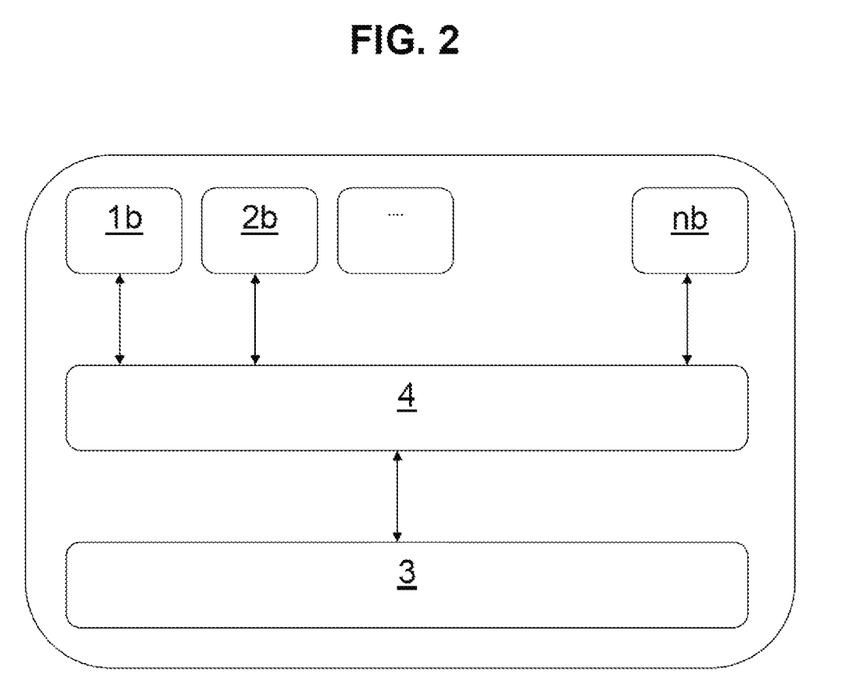
FIG. 2 is a schematic representation of a transmission system for a passive system for activating at least one functionality present in a motor vehicle according to an aspect of the present invention, the system comprising an intermediate management layer.
Figure 3:
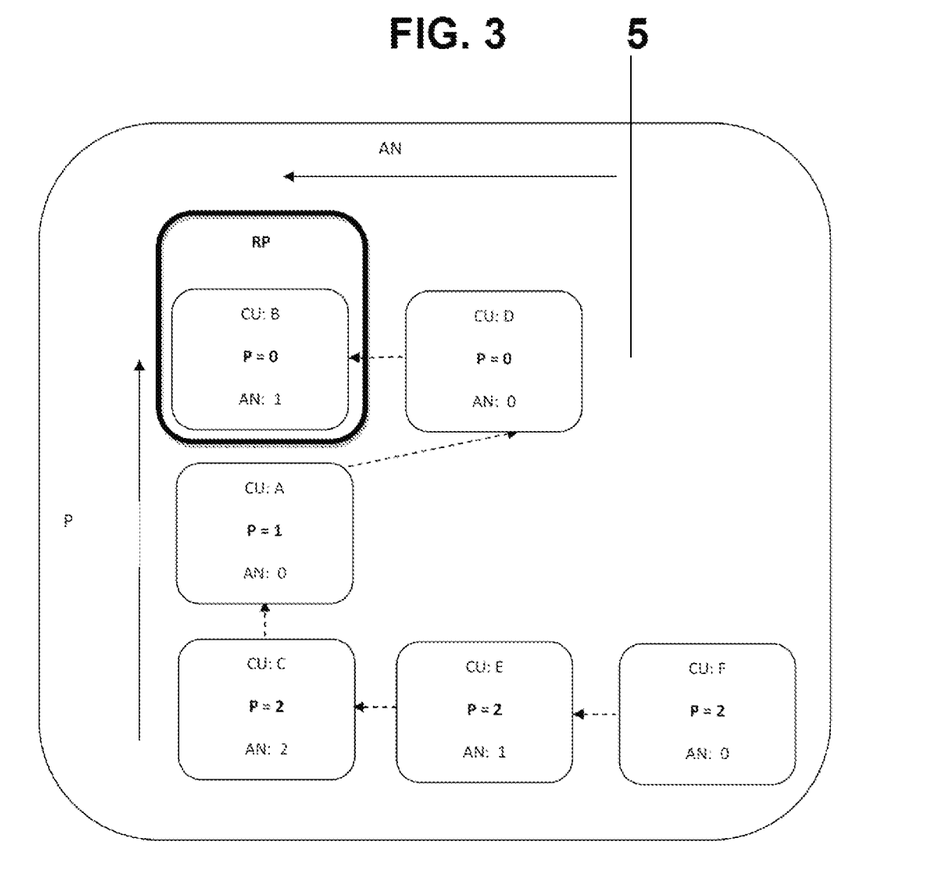
FIG. 3 is a schematic representation of a list of requests coming from use case modules, the list being incorporated in the intermediate management layer of a transmission system according to an aspect of the present invention.

With particular reference to FIGS. 2 and 3, an aspect of the present invention relates to a method for transmitting, in a passive activation system, at least one functionality present in a motor vehicle. The activation comes after a bidirectional transmission, between at least one activation means carried by one or more persons authorized to perform this activation and an activation assembly present in the vehicle, involving sending, receiving and measuring electromagnetic waves between the activation assembly and said at least one portable activation means with a view to locating said at least one portable activation means.

In the transmission system, prior to at least one activation, use-case modules 1b to nb of a respective functionality send requests A to F to locate the or each portable activation means to a protocol driver 3 in the activation assembly.

According to an aspect of the invention, between each use-case module 1b to nb and the protocol driver 3 an intermediate management layer 4 is inserted. This intermediate management layer 4 receives the requests A to F from the use-case modules 1b to nb and stores them in a list 5 present in a static matrix of optimization possibilities.

In the intermediate management layer 4, each request is classified according to, on the one hand, a priority ranking P and, on the other hand, an oldness AN of reception. To do this, priority criteria of the priority ranking P are predetermined and stored beforehand in the matrix during a design of the software of the intermediate management layer 4. The priority may, for example, relate to opening a door or to starting the vehicle engine or to safety functions.

FIG. 3, and with reference also to FIG. 2, shows various requests coming from use cases CU each referenced by letters A to F. These use requests A to F are recorded in a list 5 and the requests A to F are ranked in order of priority P and order of oldness AN with values from 0 to 2, with 0 indicating a higher priority than 2 and 2 a greater oldness than 0. A main request RP, which will be the only one to be executed is thus selected, requests compatible with the main request RP being grouped with the main request RP. The main request RP is in FIG. 3 request B but this is non-limiting.

A so-called main request RP, is therefore selected from the requests A to F available in list 5, this main request having the highest priority ranking P and the greatest oldness AN, the highest priority ranking P being preponderant over the greatest oldness AN. It is this main request RP that will serve as the basis for the protocol driver 3 to send at least one signal to the or each portable activation means.

Next, from the remaining requests in the list 5, those that are compatible with the main request RP are selected to be executed with the main request RP. There may be only one compatible request or indeed several compatible requests. Compatibility is mainly based on use cases CU relating to a function that is activated just after the function that caused the main request RP to be sent by a module and that requires an activation means placed in the same zone as for the main request RP.

For example, if the use case of the main request RP relates to opening a door of the motor vehicle, use cases that relate to the comfort of the passenger compartment or to monitoring of elements present inside the vehicle and that arise directly after the door has been opened may give rise to requests compatible with the main request RP.

At least one grouped signal corresponding to the main request RP and to the compatible requests is then sent to the or each portable activation means via the protocol driver 3. This may be done by sending the signal to each of the portable activation means one after the other.

The protocol driver 3 receives back from the or from each portable activation means at least one signal. Said at least one signal is transmitted by the protocol driver 3 to the intermediate management layer 4 and allows said at least one portable activation means to be located after software processing carried out by the intermediate management layer 4, the location being determined in the intermediate management layer 4.

The intermediate layer 4 then sends to the use-case modules 1b to nb that respectively sent the main request RP or one of the compatible requests, the location of said at least one portable activation means. This may affect only certain use-case modules and not all of the modules. This may allow a function to be activated if necessary, which activation is carried out by another module present in the main activation assembly located in the motor vehicle.

Lastly, the main request RP and the compatible requests from list 5 present in the matrix are deleted. During this time taken to send, receive and process with a view to locating the or each portable activation means, other requests could be recorded in the list 5. Old requests that have not been executed remain in list 5. When there is more than one portable activation means, it may be possible to locate all the portable activation means.

The compatibility of requests A to F may be assessed with respect to a common location zone of said at least one portable activation means necessary for activating the functionality associated with a use-case module 1b to nb. This may be a sub-zone integrated into a location zone of interest to the use-case module 1b to nb that made the request which has become the main request RP.

Location requests A to F from the respective use-case modules 1b to nb present in the list 5 may be compared one by one with the main request RP to find out whether these requests A to F are compatible or not with the main request RP. Use cases that are subordinate to one or more use cases may also be defined, in which case their requests will truly be compatible with the request of the use case to which they are subordinate.

There may be tables in the intermediate management layer 4 that establish a compatibility or incompatibility link between, for example, two use cases and therefore between the two requests coming from the modules of each of these two use cases. Compatibility testing can be done very quickly.

After deletion of the main request RP and the compatible requests from the list 5, a previously incompatible request of the highest priority ranking P and of the greatest oldness AN may become the new main request RP. It may be determined whether the other requests A to F of list 5 are compatible or incompatible with the new main request RP. This new main request RP was incompatible with the old main request and could not be grouped with the old main request.

The protocol driver 3 then sends to the or each activation means at least one signal corresponding to the new main request RP grouped with compatible requests, and the method proceeds as above with the new main request RP.

In one preferred embodiment of the present invention, the number of signals are sent, advantageously at low frequency, by the protocol driver 3 to the or each portable activation means may be limited when a subsequent request is sent to the intermediate management layer 4 by a use-case module other than the use-case modules that sent the main request RP or a request compatible with the main request RP.

In this preferred mode, the subsequent request is stored in list 5 after at least one grouped signal corresponding to the main request RP and to the compatible requests has been sent to said at least one portable activation means via the protocol driver 3. If this subsequent request is compatible with the main request RP, the location of said at least one portable activation means, which location is received back via the protocol driver 3 after processing by the intermediate management layer 4, is also sent to the use-case module that sent the subsequent request.

This subsequent request is considered to be a request compatible with the main request RP and the already determined location of the or each portable activation means is sent, by the intermediate management layer 4, to the use-case module thereof. A validation time may be taken into account, during which the location(s) remain valid.

Time may be counted in the intermediate layer 4 after the signal has been sent from the protocol driver 3 to said at least one portable activation means. When this counted time is less than a threshold period of validity or period of validation of the location of said at least one portable activation means and a new request is received in the list 5, said request being compatible with the main request RP that required the location of said at least one portable activation means, the location is sent to the use-case module 1b to nb that sent the new request.

This may even be done when the location of the or each portable activation means has already been sent to the use-case module 1b to nb that sent the main request RP or one of the compatible requests grouped with the main request RP.

Figure 4:
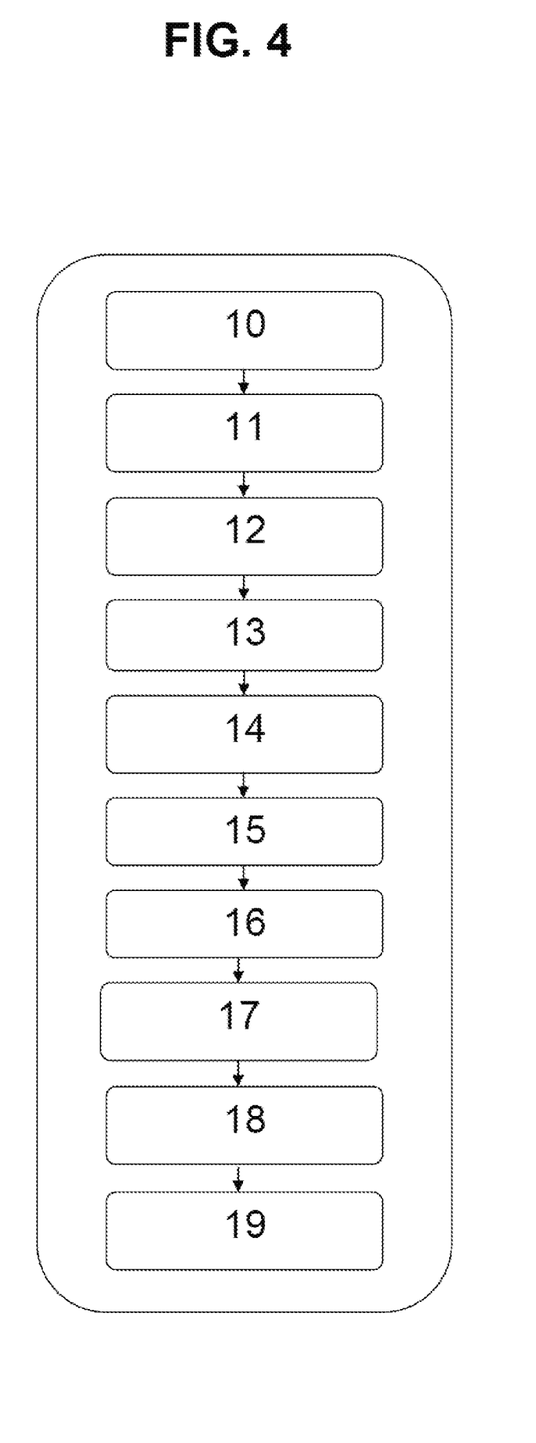
FIG. 4 is a schematic representation of a flow chart of the transmission method in a passive system for activating at least one functionality present in a motor vehicle according to an embodiment of the present invention.

FIG. 4, in combination with FIGS. 2 and 3 (for the references not shown in FIG. 4), shows a flow chart of an embodiment of the method according to the invention (some of the steps referenced in this flow chart are not essential to the implementation of the method).

The step referenced 10 in FIG. 4 is essential to an aspect of the present invention and relates to storage of a given use-case request in the list 5 of the intermediate management layer 4.

The step referenced 11 is an optional first optimization step that carries out a search to determine whether, following a previous main request, the or each activation means has already been located and the location thereof already sent to one or more activation modules, advantageously with a view to sending said location to the use-case module 1b to nb that sent the given request, when the main request and the given request are compatible. This optional first optimization is referred to as a best finished-use-case optimization.

The step referenced 12 is essential to an aspect of the present invention and relates to the identification of the use case corresponding to the request that was selected as main request RP because of its oldness AN but above all because of its order of priority P.

The step referenced 13 is an essential step corresponding to a second optimization (if the optional first optimization is taken into account) involving identifying a use case that sent a request that is still active without the protocol driver 3 sending anything to the or each portable activation means, and that covers the given request, this still active request being qualified as main request RP. This essential second optimization is referred to as a best still-active-use-case optimization.

The step referenced 14 is an essential step of the method of an aspect of the present invention and corresponds to the protocol driver 3 sending, in accordance with a main request RP, at least one, advantageously low-frequency, signal to the or each portable activation means.

The step referenced 15 is an essential step of the method of an aspect of the present invention and corresponds to at least one, advantageously radio-frequency, signal being sent back from the or a first portable activation means to the protocol driver 3. It will be noted that each portable activation means is not able to determine its position and therefore to give its location. In contrast, the location of a portable activation means will be known after mathematical processing by the intermediate management layer 4 of the signal or signals sent by each portable activation means.

The step referenced 16 is an optional step corresponding to a third optimization (if the two previous optimizations are taken into account) involving identifying all the use cases that sent a request without the protocol driver 3 specifically sending anything to the or each portable activation means, and the request of which may be covered by the response of the first portable activation means after processing of said at least one signal sent back. This optional third optimization is referred to as optimized-use-case optimization. The optimized use cases and the active use cases can be stored by being linked with a view to simultaneously processing the locations required thereby of the or each portable activation means.

Step 17 corresponds to the processing of the signals sent back from the portable activation means or means to determine their location and is essential to an aspect of the present invention. For example, send and receive means connected to the protocol driver 3 may take the form of several antennas arranged at various places in/on the vehicle. A mathematical position of the or each activation means may then be determined via at least one reception-end measurement of the power received back by each antenna from the or each activation means.

The step referenced 18 is an optional step corresponding to a fourth optimization, which is carried out after the location of the last portable activation means has been obtained by processing in the intermediate management layer 4, of all the use cases the modules of which may be replied to simultaneously by sending the locations of the portable activation means, by the use-case module that sent the main request RP that had priority over all the other requests A to F.

In step 19 the locations of the or each portable activation means are sent to the use-case modules that sent the main request RP or a request compatible with the main request RP. This step is essential for the implementation of an aspect of the present invention.

An aspect of the present invention also relates to a group of an assembly for activating at least one functionality present in a motor vehicle and of at least one activation means carried by one or more persons authorized to operate this activation. Activation occurs following a bidirectional transmission between said at least one activation means and a transmission system integrated into the activation assembly.

The transmission system comprises means for transmitting, advantageously at low frequency, for receiving, advantageously at radio frequency, and for measuring electromagnetic waves to and from the or each portable activation means with a view to locating said at least one portable activation means after the electromagnetic waves received back from the or each portable activation means have been processed. The transmission system comprises use-case modules 1b to nb of a respective functionality that send requests A to F to locate said at least one portable activation means to a protocol driver 3 of the system.

According to an aspect of the invention, the transmission system, which implements the method as described above, comprises an intermediate management layer 4 comprising means for receiving and storing requests A to F sent by use-case modules 1b to nb in a list 5 present in a static matrix of possibilities of optimization with means for ranking the requests A to F in oldness AN and in priority P according to priority criteria stored in the matrix.

The intermediate management layer 4 also comprises first means for selecting a so-called main request RP and second means for selecting one or more requests from the list 5 that are compatible with the main request RP. The protocol driver 3 comprises means for sending a grouped signal depending on the selected requests and means for receiving at least one signal back from said at least one portable activation means. The protocol driver 3 comprises means for transmitting said at least one signal to the intermediate management layer 4.

According to an aspect of the invention, it is the intermediate management layer 4 that processes the signals received back to determine the location of the or each portable activation means. The intermediate management layer 4 comprises means for processing said at least one signal for locating the or each portable activation means and means for sending the location to each of the use-case modules that sent a request main RP or a request compatible with the main request RP, as well as means for updating the list 5 of requests A to F.

It should be noted that an aspect of the present invention may be generalized to any geolocation and bidirectional communication system having different functionalities to be implemented in an order of priority P.

The invention claimed is:

1. A method for transmitting, in a passive activation device, at least one functionality present in a motor vehicle, the activation coming after a bidirectional transmission, between at least one activation means carried by one or more persons authorized to perform this activation and an activation assembly present in the vehicle, involving sending, receiving and measuring electromagnetic waves between the activation assembly and said at least one portable activation means with a view to locating said at least one portable activation means, use-case modules of a respective functionality sending requests to locate said at least one portable activation means to a protocol driver in the activation assembly, comprising:
  inserting between each use-case module and the protocol driver, an intermediate management layer that:
  receives requests from use-case modules and stores them in a list present in a static matrix of optimization possibilities,
  classifies each request according to, on the one hand, a priority ranking and, on the other hand, an oldness of reception, priority criteria of the priority ranking being predetermined and stored beforehand in the matrix,
  selects a main request having the highest priority ranking and the greatest oldness, the highest priority ranking being preponderant over the greatest oldness,
  selects, from the requests remaining in the list, those that are compatible with the main request to be executed with the main request,
  sends at least one grouped signal corresponding to the main request and to the compatible requests to said at least one portable activation means via the protocol driver,
  the protocol driver receiving back from said at least one portable activation means at least one signal that is transmitted to the intermediate management layer and that allows said at least one portable activation means to be located after processing,
  the intermediate layer then sends to the use-case modules that respectively sent the main request or one of the compatible requests, the location of said at least one portable activation means, and
  deletes the main request and the compatible requests from the list present in the matrix.

2. The method as claimed in claim 1, wherein a compatibility of the requests is carried out with respect to a common location zone of said at least one portable activation means necessary for activating the functionality associated with a use-case module.

3. The method as claimed in claim 1, wherein the location requests from the respective use-case modules present in the list are compared one by one with the main request to find out whether these requests are compatible or not with the main request.

4. The method as claimed in claim 1, wherein, after the main request and the compatible requests have been deleted from the list, a previously incompatible request of the highest priority ranking and of the greatest oldness becomes the new main request and it is determined whether the other requests in the list are compatible or incompatible with the new main request.

5. The method as claimed in claim 1, wherein, when a subsequent request is sent to the intermediate management layer by a use-case module and stored in the list after at least one grouped signal corresponding to the main request and to the compatible requests has been sent to said at least one portable activation means via the protocol driver, and when this subsequent request is compatible with the main request, the location of said at least one portable activation means, which location is received back by the intermediate management layer via the protocol driver, is also sent to the use-case module that sent the subsequent request.

6. The method as claimed in claim 1, wherein time is counted in the intermediate layer after the signal has been sent from the protocol driver to said at least one portable activation means and, when this counted time is less than a threshold duration of validity of the location of said at least one portable activation means and a new request that is compatible with the main request that required the location of said at least one portable activation means is received in the list, the location is sent to the use-case module that sent the new request.

7. The method as claimed in claim 1, wherein, when said at least one portable activation means is not unitary, all the portable activation means are located.

8. A group of an assembly for activating at least one functionality present in a motor vehicle and of at least one activation means carried by one or more persons authorized to perform this activation, the activation coming after a bidirectional transmission between said at least one activation means and a transmission system integrated into the activation assembly, the transmission system sending, receiving and measuring electromagnetic waves to and coming from said at least one portable activation means with a view to locating said at least one portable activation means, the transmission system comprising use-case modules of a respective functionality that send requests to locate said at least one portable activation means to a protocol driver of the system, comprising:
  inserting between each use-case module and the protocol driver, an intermediate management layer that:
  receives requests from use-case modules and stores them in a list present in a static matrix of optimization possibilities,
  classifies each request according to, on the one hand, a priority ranking and, on the other hand, an oldness of reception, priority criteria of the priority ranking being predetermined and stored beforehand in the matrix,
  selects a main request having the highest priority ranking and the greatest oldness, the highest priority ranking being preponderant over the greatest oldness,
  selects, from the requests remaining in the list, those that are compatible with the main request to be executed with the main request,
  sends at least one grouped signal corresponding to the main request and to the compatible requests to said at least one portable activation means via the protocol driver,
  the protocol driver receiving back from said at least one portable activation means at least one signal that is transmitted to the intermediate management layer and that allows said at least one portable activation means to be located after processing,
  the intermediate layer then sends to the use-case modules that respectively sent the main request or one of the compatible requests, the location of said at least one portable activation means, and
  deletes the main request and the compatible requests from the list present in the matrix,
  the system further comprising:
  an intermediate management layer for receiving and storing requests in a list present in a static matrix of optimization possibilities for ranking the requests in oldness and priority according to priority criteria stored in the matrix,
  selecting a main request and
  selecting requests from the list that are compatible with the main request, the protocol driver sending a signal grouped depending on the selected requests and means for receiving at least one signal back from said at least one portable activation means and transmitting said at least one signal to the intermediate management layer, the intermediate layer comprising processing said at least one signal with a view to locating said at least one portable activation means and means for sending the location to each of the use-case modules that sent a main request or a request compatible with the main request as well as means for updating the list of requests.

9. The group as claimed in claim 8, wherein the transmission system comprises low-frequency means for sending to said at least one portable activation means and radio-frequency means for receiving from said at least one portable activation means.

10. The group as claimed in claim 8, wherein the send and receive means take the form of a plurality of antennas arranged at different places on the vehicle, a mathematical position of said at least one activation means being determined via at least one reception-end measurement of the power received back by each antenna from said at least one activation means.

11. The method as claimed in claim 2, wherein the location requests from the respective use-case modules present in the list are compared one by one with the main request to find out whether these requests are compatible or not with the main request.

12. The group as claimed in claim 9, wherein the send and receive means take the form of a plurality of antennas arranged at different places on the vehicle, a mathematical position of said at least one activation means being determined via at least one reception-end measurement of the power received back by each antenna from said at least one activation means.

* * * * *